US006761826B2

(12) United States Patent
Bender (10) Patent No.: US 6,761,826 B2
(45) Date of Patent: Jul. 13, 2004

(54) PULSED BLACKBODY RADIATION FLUX ENHANCEMENT

(75) Inventor: Jim Bender, Roseville, CA (US)

(73) Assignee: New Star Lasers, Inc., Roseville, CA (US); part interest (*) Notice: Subject to any disclaimer, the term of this patent is extended or adjusted under 35 U.S.C. 154(b) by 0 days.

(21) Appl. No.: 10/007,310

(22) Filed: Nov. 30, 2001

(65) Prior Publication Data

US 2003/0102269 A1 Jun. 5, 2003

(51) Int. Cl.[7] .................................................. C02F 1/30
(52) U.S. Cl. .................. 210/748; 210/791; 210/321.69; 210/333.01; 422/24; 422/186.3
(58) Field of Search ................................. 210/748, 791, 210/321.69, 333.01; 422/24, 186.3

(56) References Cited

U.S. PATENT DOCUMENTS

| | | |
|---|---|---|
| 4,141,830 A | 2/1979 | Last |
| 4,179,616 A | 12/1979 | Coviello et al. |
| 4,230,571 A | 10/1980 | Dadd |
| 4,273,660 A | 6/1981 | Beitzel |
| 4,274,970 A | 6/1981 | Beitzel |
| 4,400,270 A | 8/1983 | Hillman |
| 4,437,999 A | 3/1984 | Mayne |
| 4,595,498 A | 6/1986 | Cohen et al. |
| 4,758,415 A | 7/1988 | Patil |
| 4,787,980 A | 11/1988 | Ackermann et al. |
| 4,792,407 A | 12/1988 | Zeff et al. |
| 4,846,978 A | 7/1989 | Leggett et al. |
| 4,910,438 A | 3/1990 | Farnsworth |
| 4,913,827 A | 4/1990 | Nebel |
| 5,124,051 A | 6/1992 | Bircher et al. |
| 5,124,131 A | 6/1992 | Wekhof |
| 5,130,031 A | 7/1992 | Johnston |
| 5,151,252 A | 9/1992 | Mass |
| 5,170,091 A | 12/1992 | Wekhof |

(List continued on next page.)

OTHER PUBLICATIONS

Auburn Journal, "Two chemists may have 'stumbled' onto MTBE solution", Jan. 2, 1998 1 page.
Assciated Press, "New way to purify water that has MTBE", undate, 1 page.

(List continued on next page.)

Primary Examiner—Betsey Morrison Hoey
(74) Attorney, Agent, or Firm—Ray K. Shahani, Esq.

(57) ABSTRACT

A system and method for enhancing the flux and separation properties of water filtration membranes by oxidizing raw or processed water constituents with direct photolysis of the water matrix by pulsed blackbody UV, yielding ozone and hydrogen peroxide, hydroxyl radicals and other short lived oxidizing species. The result thereof, causing precipitation of inorganic molecules or organically complexed minerals, partial or complete mineralization of organic molecules and the deactivation or destruction of microbes including: virus, bacteria and protozoa. The system and method comprises a pulsed blackbody, deep-UV reactor having at least one treatment chamber, the reactor having a conveying assembly to convey the water to be treated into the chamber; a filter assembly to screen the UV treated water; a caustic supply means for the post-treatment of water; a recovering assembly recovering the permeate at an outlet of the filtration means. The effect of such UV water treatment is multifaceted. One aspect is the reduction of the transmembrane pressure (TMP), another is the reduction of duration of backwash and caustic cleaning cycles. Also, the oxidation of iron and manganese to insoluble compounds, without the addition of oxidizing agents, does not harm the membranes. Iron and manganese turn into hydroxide crystals trapped by the filtration membrane and separated from the permeate. These effects integrate to enhance the water flux through the filter membrane.

20 Claims, 9 Drawing Sheets

U.S. PATENT DOCUMENTS

| | | | |
|---|---|---|---|
| 5,178,755 | A | 1/1993 | LaCrosse |
| 5,215,633 | A | 6/1993 | Liboff et al. |
| 5,238,581 | A | 8/1993 | Frame et al. |
| 5,308,480 | A | 5/1994 | Hinson et al. |
| 5,312,534 | A | 5/1994 | Liboff et al. |
| 5,330,661 | A | 7/1994 | Okuda et al. |
| 5,466,367 | A | 11/1995 | Coate et al. |
| 5,480,562 | A | 1/1996 | Lemelson |
| 5,547,590 | A | 8/1996 | Szabo |
| 5,607,593 | A | 3/1997 | Cote et al. |
| 5,648,592 | A | 7/1997 | Pierce |
| 5,652,050 | A | 7/1997 | Pall et al. |
| 5,686,503 | A | 11/1997 | Nohr et al. |
| 5,688,378 | A | 11/1997 | Khoe et al. |
| 5,741,427 | A | 4/1998 | Watts et al. |
| 5,789,755 | A | 8/1998 | Bender |
| 5,834,784 | A | 11/1998 | Morgan et al. |
| 5,837,142 | A | 11/1998 | Mullerheim et al. |
| 5,846,604 | A | 12/1998 | Caldwell |
| 5,891,399 | A | 4/1999 | Owesen |
| 5,954,902 | A | 9/1999 | Caldwell |
| 6,028,316 | A | 2/2000 | Bender |
| 6,201,355 | B1 | 3/2001 | Morgan et al. |

OTHER PUBLICATIONS

Sacramento Bee, EPA asked to reject MTBE fuel additive:, Dec. 10, 1997, 2 pages.

SN&R, "trouble on Tap: What's in Sacrament's Drinking water?", Dec. 11, 1997, 3 pgs.

Komex–H20 Science, unversity of Southern California, literature Review of Technologies for Treatment Of Methy Teriary Butyl Ether (MTBE) in Drinking water, Apr. 22, 1997.

World Wide Web publications, :Chvron Gasoline Questions and Answers: Methy Tertiary Butyl Ether (MTBE):, 8 pages.

World Wide Web publication,: Biodegradation MTBE and Other Oxygenates kulpa3.html at www.nd.edu, 2 apges.

Water Disinfection with Ultraviolet Light, Aquagine Wedeco Environmental Systems,INC. brochure, 1996.

Ultrviolet– UV Disinfection in Power Cogeneration, Ultrapure Water, vo. 12, No. 5 Jul./Aug. 1995.

Photoytic oxidation of contaminated water using a high energy, pulsed ultr–violet flashlamp operating in the blackbody regime, James B. bender, 1997, OSA symposium "UV Sources for Lithpgraphy, mat4erials processing , and Biomedical Applications: 2" Oct. 1997.

Environmental Product Porfiles: UVERG Portable UV Detoxifaction System; National Environment Technology Applicants Corporation, 1 page.

Geraghty & Miller, Inc., The Groudwater Newsletter: Portable UV Treament System Being commercialized, 1 page.

Haztech News: Process uses Pulsing UV Continumm to Destroy Organics in Water, Air vol. 7, No. 8, Apr. 16, 1992, 1 page.

Technology Notebook: UV tehcnology nears commercialzatrion, Kimberly A Roy, 2 pgs.

Ultraviolet Energy Generators, Inc., Treatment of Contaminated Water, Air, and Soil with UV Flashlamps; Alex Wekhof, Nov. 1991, 7 pages.

Technology; The next generation of Ultrviolet light technologies; Kimberly A. Roy 2 pgs.

Treatment of Groundwater with UV Flashlamps, The Third Generation UV Systems Alex Wekhof, Edwin Folsom Jr. and Yuval Halpren, Nov./Dec. 1992; 6 pgs.

AIWEK–TEC– PUVD technology, Alex Wekhof, 6 pages.

PULSED BLACKBODY RADIATION FLUX ENHANCEMENT

FIELD OF THE INVENTION

The present invention is related to use of high-intensity, typically pulsed, broadband or deep ultraviolet wavelength electromagnetic radiation for providing non-chemical flux enhancement and virus kill in microfiltration hollow-fiber membrane water treatment.

BACKGROUND OF THE INVENTION

Current water purification technologies, including distillation, reverse osmosis, and carbon filtration usually produce suitable water quality, but their high capital, operating and maintenance costs have limited their use to only those situations where water shortages are most extreme or where cost is less important. Water contaminated with pesticide or gasoline contaminants are especially difficult and costly to remove with conventional technologies.

Both advantages and disadvantages of the prior art technologies are summarized below:

Vapor compression (VC), including distillation technology systems are used on drinking water for both pathogen and chemical contamination remediation, remove total dissolved solids (TDS) and are excellent for desalinization. Drawbacks include a relatively high price, a generally large size, non portability and fairly complex construction and operation.

Reverse Osmosis (RO) removes TDS with a relatively simple mechanism. Removal of non-volatile organics, pathogen is easy. However, the systems are subject to contaminating product water if feed water pressure and turbidity are out of operating parameters, involve a high price rate, does not remove dissolved organic compounds and are complex and sophisticated.

Air stripping (AS) is generally the least expensive form of water remediation and is fairly good at removing volatile organics. However, these systems are also large, very noisy and unsightly, do not remove non-volatile organics, do not remove pesticides or pathogens, depend on ancillary technology, like the use of granulated activated carbon (below), resulting in more O&M cost as well as air pollution (the volatile organics are transferred into the atmosphere).

Granulated activated carbon (GAC) are effective at removing volatile and non-volatile organics like pesticides, is likewise effective at removal of pathogens, and can be reactivated in most cases. However, GAC also requires resupply of heavy, bulky material, typically has a large adsorption ratio, such as about 1000 pounds GAC to 1 pound contaminant, and itself becomes a source of contamination of product water if allowed to saturate. Furthermore, saturated GAC is a hazardous waste product and must be handled as such, especially when considering issued including transportation, disposal or reactivation cost.

Low and medium pressure mercury vapor ultraviolet (UV) radiation is also effective at destroying or inactivating pathogens, but only very slightly effective on organic or synthetic organic compounds at practical flow rates. Sometimes UV is used as part of a polishing loop on larger treatment systems. However, as a practical matter, use of UV radiation in the past has been impossible. These systems are not practical for treating chemically contaminated water, the available low pressure lamps are typically not self cleaning, would require hundreds of lamps to equal the dosage of a lamp of the present invention, and provide a larger footprint for any type of alternative remediation application.

Mercury lamps emit wavelengths from excited mercury, though not in a smooth arc continuum like the radiator of the present invention, but rather in discrete "atomic lines" that have very narrow bandwidths. Most of the energy is contained in the 254-nm line with lesser amounts in the 185-nm and 365-nm lines. Mercury lamps also produce especially in the case of medium pressure mercury lamps a low emissivity continuum. That is, a very small level of "background" UV that spans from 185 nm to 400 nm.

Ozone saturation is effective at reducing counts and effects of pathogens and leaves no dangerous chemicals in the water. However, providing a system which injects ozone into a water supply or stream leaves physically a rather large footprint, i.e., requires a larger operation to achieve equivalent effect, is complex to build and operate, involves high operation and maintenance costs, involves the production of ozone a dangerous and reactive gas, and is not practical or feasible for treatment of chemical contaminants alone.

Finally, the use of chlorine (Cl) is known to act aggressively against pathogens but has few remedial effects on chemical contaminated water except for elimination of cyanides. Current competing technologies for chemical contamination of groundwater include reverse osmosis (RO), air stripping, and Activated Carbon filtration. Although the popularity of RO has gained substantially in market share in recent years, different technology solutions continue to dominate the various niches. RO membrane production is dominated by a few companies (DuPont, Sow-Filmtec, Fluid Systems, Toyoba, etc.), but there are thousands of companies that act as integrators of RO systems. Air stripping is older technology and lower cost, but is noisy, unsightly, pollutes the air, and has limited effectiveness in removing MTBE to current and foreseeable EPA standard levels. Activated Carbon filtration involves large quantities of carbon supplied by companies like Calgon, Inc.

Pathogen removal from drinking water is sometimes accomplished with the addition of chlorine, distillation techniques, or the use of banks of low or medium pressure ultraviolet lamps. Distillation suppliers include large European, Japanese, and Korean manufacturers and contractors, and this technology excels at the removal of TDS (total dissolved solids). Current ultraviolet lamp suppliers include Aquafine, Fisher & Porter, and Puress, Inc. There exists a need for technology which is more energy efficient and can simultaneously remove, inactivate or destroy pathogenic and chemical contamination. Such equipment could also be used for post-treatment at desalination facilities to remove chemical contaminants.

Traditional UV technology relies on low and medium pressure UV lamps, similar to the fluorescent lamps used in office buildings. Medium pressure lamps are operated at higher power levels than the low pressure lamps and, consequently, are slightly more efficient than the standard low-pressure variety. The typical low-pressure lamps operate in a range from about 30 to about 100 watts while the medium pressures radiators average about 3000 watts. Typically, both lamp types are known as atomic line radiators. They produce light energy in very narrow wavelength bands at 10–20% electrical efficiency. Both types operate with AC-type current and are controlled by electrical ballast.

Though the lamp life is generally very long, maintenance cost are generally very high, especially in the case of low-pressure lamps. Cleaning is a significant problem. Lamps become fouled in the water environment from precipitated dissolved solids and "scum". This fouling action gradually reduces the UV output rendering the individual lamp wholly or partly useless. Therefore, these lamps must be removed on periodic bases and manually cleaned. Furthermore, low- and medium-pressure lamps do not produce the radiative power levels to effectively dissociate the chemical bonds of many common types of contaminants. They find their principle usage in the wastewater reclamation industry for biological degradation. At a single installation, these lamps are used hundreds and sometimes thousands at a time, thus amplifying the operating and maintenance (O&M) costs.

Improvements to this type of technology include: enhanced chemical doping of the glass used in the envelope of the lamp to increase its UV conversion efficiency, improved cold cathodes to prolong lamp life and improved reaction chambers or effluent channels to maximize dosage and throughput and to minimize head loss.

U.S. Pat. No. 5,891,399 issued to Owesen teaches a device, used in an air purifying system. The device includes an Ultraviolet (UV) radiation source, a pre-filter, and a post-filter.

U.S. Pat. No. 5,312,534 issued to Liboff et al. teaches a method and apparatus for enhancing the transport of a selected ion having a predetermined charge-to-mass ratio through a biomolecular membrane located in a space subjected to a local magnetic field.

U.S. Pat. No. 5,652,050 issued to Pall et al. teaches melt-blown fibrous webs having a uniform structure for use in processing biological fluids such as blood, urine, and saliva, particularly useful for separating plasma or serum from blood.

U.S. Pat. No. 5,238,581 issued to Frame et al. presents a method of enhancement of oxidation of complexed cyanide using oxygen as the oxidizing agent when certain metal chelates are used as catalysts, to reduce the cyanide concentration in aqueous streams arising from complexed cyanide. The enhancement is achieved by irradiating the complexed cyanide with ultraviolet light prior to or concurrent with the oxidation. The oxidation can be performed heterogeneously, especially in a continuous fashion using a packed bed reactor, by using suitable water-insoluble metal chelates, when supported on appropriated carriers.

U.S. Pat. No. 4,846,978 issued to Leggett et al. teaches an improvement in the process which destroys the metal chelate by ozonation to decontaminate the waste streams. The addition of magnesium hydroxide to the solution containing the metal chelates prior to ozonation permits more effective and faster decomposition of the chelates.

U.S. Pat. No. 4,849,114 issued to Zeff et al. describes an improved method of treating halolgenated or partially oxygenated hydrocarbons in aqueous solutions by using in combination, ozone, hydrogen peroxide and ultraviolet radiation simultaneously. The addition of hydrogen peroxide to the UV/ozone combination results in a greatly increased efficiency of oxidation, particularly for compounds which are resistant to oxidation by ozone and UV.

U.S. Pat. No. 5,741,427 issued to Watts et al teaches a system for treating contaminants in an in situ environment in which an oxidizing agent and a unique reagent comprised of a reaction product complex formed from the reaction of a ligand donor and a metal catalyst is provided to the in situ environment to thereby reduce or eliminate contaminants present therein.

U.S. Pat. No. 5,688,378 issued Khoe et al teaches a process for the photoassisted oxidation of dissolved species such as arsenic, iron, phosphorous and sulphur by supplying to a solution including the species to be oxidized an oxidant and a photoabsorber, and then irradiating the resultant solution with UV/electromagnetic radiation. The resulting oxidized species can then be subsequently treated, used or removed through precipitation.

U.S. Pat. No. 5,837,142 issued to Mullerheim et al describes a method and apparatus for treating sanitary wastewater using membrane filtration. The system separates wastewater into liquid and concentrated solid components by membrane separation. The liquid component is discharged or reused as is, or is further treated to render it disposable or reusable for particular applications. Alternatives for treating the liquid component include deodorization and biological stabilization by ultraviolet radiation and ozonation.

U.S. Pat. No. 5,607,593 issued Cote et al teaches an installation for the treatment of potable water including a reactor with a treatment chamber, a plurality of filtration membranes laid out within the chamber, and an ozone injection assembly.

U.S. Pat. No. 5,215,633 issued to Liboff et al. teaches a method for enhancing the transport of a selected ion having a predetermined charge-to-mass ratio through a biomolecular membrane located in a space subjected to a local magnetic field.

SUMMARY OF THE PRESENT INVENTION

The present invention combines emerging technologies of pulsed blackbody ultraviolet light integrated with hollow-fiber microfiltration membranes to provide advanced municipal and industrial water treatment.

The present invention comprises a system and method for enhancing the flux and separation properties of water filtration membranes by oxidizing raw or processed water constituents with direct photolysis of the water matrix by pulsed blackbody UV, yielding ozone and hydrogen peroxide, hydroxyl radicals and other short lived oxidizing species. The result is precipitation of inorganic molecules or organically complexed minerals, partial or complete mineralization of organic molecules and the deactivation or destruction of microbes including: virus, bacteria and protozoa thereby enhancing the overall flux or flow of water through the individual membranes.

The system and method for enhancement of water flux through a filter membrane comprises a UV reactor having at least one treatment chamber, the reactor having an assembly to convey the water to be treated into the chamber; a filter assembly such as a filtration membrane to screen the UV treated water; an optional caustic supply means for the post-treatment of water; and a recovering assembly for recovering the permeate at an outlet of the filtration membrane or other means.

The effect of such UV water treatment prior to ultrafiltration or other filtration is multifaceted. One important and valuable aspect of the present invention is the reduction of the transmembrane pressure (TMP), that it, the pressure drop of the water across the membrane. Another benefit of the present invention is the reduction in the backwash and caustic cleaning cycle times, concentrations and pressures required. The oxidation of iron and manganese to insoluble compounds, without the addition of oxidizing agents, does not harm the membranes. Iron and manganese turn into hydroxide crystals trapped by the filtration membrane and separated from the permeate. Such UV treatment prevents the formation of a biofilm on membrane by reducing the microbes by reducing their food source, namely organic compounds thereby leading to reduced TMP. These effects integrate to enhance the water flux through the filter membrane, cartridge or other filter means.

OBJECTS AND ADVANTAGES OF THE PRESENT INVENTION

Thus, it is an object and an advantage of the present invention to provide a method which requires a drastically reduced operating footprint. It would be desirable to provide one lamp which can provide the same dosage that would take hundreds of mercury UV lamps and can do so more efficiently since most (80%) of the blackbody radiation spectrum from the lamp is used. In contrast, the mercury lamps of the prior art produce a very narrow bandwidth of usable UV energy with an energy efficiency of only about 15–20%.

Another object of the present invention is to provide UV blackbody radiation that ranges from about 750,000 to about 9 million overall watts of broadband primarily deep UV radiative power produced at average power inputs ranging from about 2,500 watts to about 18,750 watts per lamp. These power output levels would easily provide enough energy per pulse to dissociate chemical bonds and a sufficient number of pulses per second would sustain the free radical chain reaction or reactions necessary to oxidize/reduce the contaminants present.

Another object and advantage of the present invention is to provide thousands of times more dosage to destroy pathogens, at a lower energy cost, than the standard, currently marketed, UV technology.

Another object of the present invention is to provide a unique reaction chamber design that overcomes the problems of light absorption based on water quality. In this way, water that has a high level of dissolved solids, that would normally absorb light energy, can be used without any extra filtering or pretreatment.

Another object and advantage of the present invention is to provide a system that can be produced inexpensively, resulting in lower capital cost per unit. Another object of the present invention is to provide a system which requires low operation and maintenance costs. Such systems would operate automatically with minimal maintenance.

Another advantage of the present invention is to provide high intensity broadband radiation to provide the absorption wavelengths necessary for disruption of, essentially and effectively, all organic bonds, resulting in high efficiency organic bond dissociation, with as much as or more than 80% of the total light energy generated to oxidized the constituent contaminants.

One object and advantage of the UV water treatment of the present invention is the reduction of the transmembrane pressure (TMP).

Another object and advantage of the present invention is to provide a system with reduced required backwash and caustic cleaning cycle times, volumes and concentrations.

Another object and advantage of the UV water treatment is the oxidation of iron and manganese to insoluble compounds without the addition of oxidizing agents, which can harm the membrane. The filtration membrane is now able to trap iron and manganese and separate them form the permeate.

A further object and advantage of the present invention is the prevention of a biofilm formation on the membrane by reduction of the microbes and the reduction of their food source, namely organic compounds; leading to reduced TMP.

A further object and advantage of the present system is that it is non-chemical, compact and cost effective and preconditions water to pass through a microfilter.

All these benefits enhance the flux of water through the membranes, leading to cost reductions and overall increased water treatment system efficacy.

BRIEF DESCRIPTION OF THE DRAWINGS

The invention is illustrated below and represented schematically in the following drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

Figure 1:
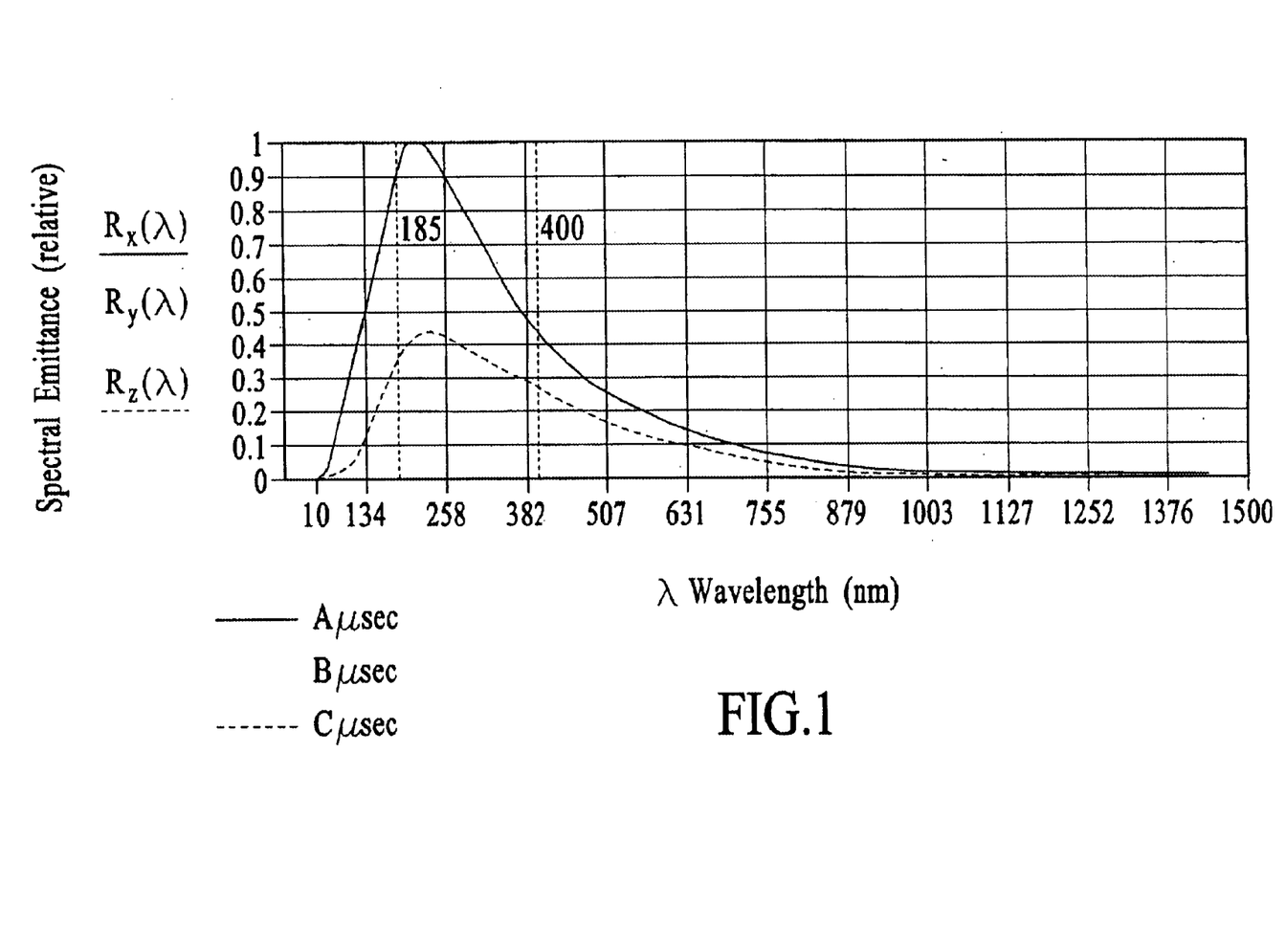
FIG. 1 is a representative plot of the spectral response of the pulsed blackbody, deep-UV system of the present invention.

FIG. 1 is a representative plot of the spectral response of the pulsed blackbody, deep-UV system of the present invention. In it's most general sense, pulsed blackbody, deep-UV, refers in the presention application to a "broadband" emission of radiation that is dependant on the temperature of the radiating "surface." The surface, in this case, is a "plasma" generated in a long quartz tube from a combination of inert gases such as xenon, argon and krypton by a specifically shaped electrical pulse. This electrical pulse, on the order of microseconds in duration, quickly ionizes the gas and compresses it to a thin "shell" near the inside surface of the quartz tube, which drives the temperature of the plasma shell to the range of 12,000 degrees Kelvin (K) to 20,000 K. These temperatures and the shell geometry of the plasma, produce UV that spans wavelengths from 185 nanometers (nm) to 400 nm in a profile like that of FIG. 1. The smooth curvature of that radiation response the "continuum" encompasses wavelengths near their "maximum power flux" levels, measured in watts per centimeter squared per micron (W/cm2/$\mu$m). This is also known as "spectral emittance" or "spectral irradiance," which refers to the power emitted from the surface of the quartz tube, or "flashlamp."

The combination of high spectral emittance and broadband continuum is "high emissivity continuum." Emissivity here refers to how well the surface radiator, i.e., the plasma, emits radiation. If the plasma shell was thick, most of the radiation, especially at the shorter wavelengths, would be absorbed by the plasma itself, resulting in lower spectral irradiance and ultimate UV dosage. this is the case of low emissivity. However, in the pulsed blackbody, deep-UV lamp the plasma shell is made thin thereby minimizing the absorption losses and increasing the UV efficiency and high emissivity.

The integration of pulsed blackbody, deep-UV with hollow-fiber microfiltration provides an effective multiple barrier for particles, bacteria, virus and protozoan cysts. By placing the pulsed blackbody, deep-UV unit on the raw water supply upstream of the membrane treatment, not only does pathogen and total organic carbon (TOC) removal take place but membrane flux enhancement (fewer membrane canisters can be used for the same permeate flow), reduced fouling and extended time before required chemical cleaning is realized.

Pulsed blackbody, deep-UV, when integrated with microfiltration, has also been shown to provide oxidation and removal of iron and manganese1 thereby making possible effective filtration of those constituents.

Microfiltration (MF) is a size-exclusion, pressure-driven membrane process that operates at ambient temperature in either a crossflow or flow-through configuration. It's usually considered an intermediate between ultrafiltration and multimedia granular filtration with pore sizes ranging from 0.10- to-10 microns. It operates at pressures between 10 pounds per square inch gauge (psig) and 30 psig. MF membranes are available that can provide high quality drinking water with turbidity of less than 0.05 NTU and that exceeds Surface Water Treatment Rule (SWTR) requirements for Giardia and Cryptosporidium log removal.2 By integrating MF membranes with pulsed blackbody, deep-UV, a more effective virus kill, as well as secondary barrier control of bacteria can also be accomplished.

Low or medium pressure ultimately indicates the amount of mercury available in the plasma stream inside of the lamp. The implications of higher pressures are:
1. More actinic wavelengths become available (atomic lines),
2. More input power is required,
3. More actinic output power is developed meaning radiation by which chemical changes are produced with up to 35 percent contained in discrete wavelengths 185 nm, 254 nm, 365 nm, and low level emissivity,
4. Higher lamp surface temperatures (800° C. in medium pressure lamps), and
5. A higher probability of explosion.

The term pulsed UV encompasses a number of technologies. As an example, pulsed white light (PWL) should not be confused with the present invention. PWL as its name implies, predominantly radiates in the visible region, a visible blackbody peak is present at 450 nm, with a much lower emissivity continuum and even UV atomic-line radiation similar to that produced in mercury lamps.

Figure 2:
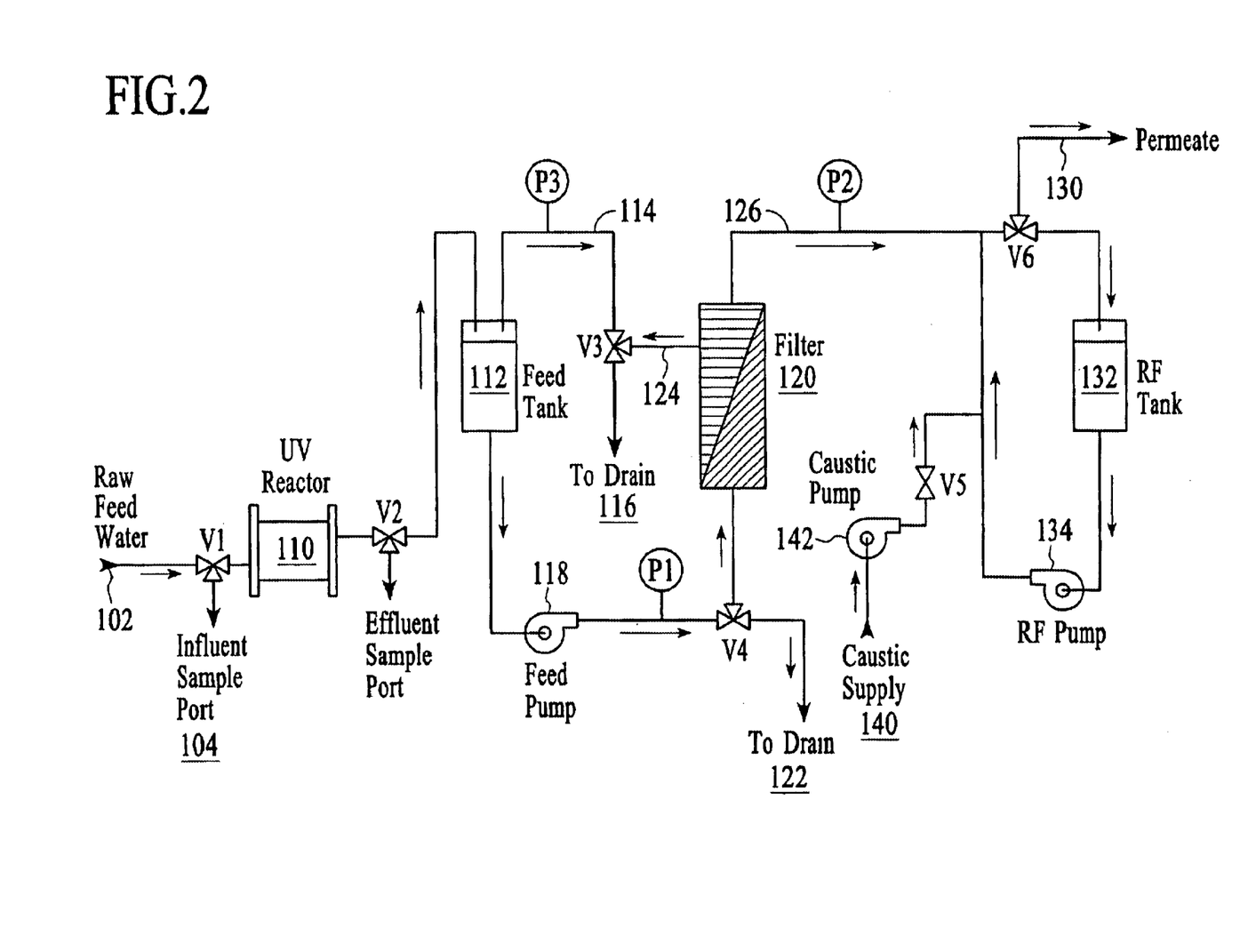
FIG. 2 is a schematic representative view of a process flowchart of a preferred embodiment of the method and system of the present invention.

FIG. 2 is a schematic representative view of a process flowchart of a preferred embodiment of the method and system 100 of the present invention. It will be understood that the following description can be modified in ways which will be obvious to those skilled in the art such modificuation shall be considered within the scope of the present invention.

The overall system 100 is shown in FIG. 2. Raw feed water 102 and other influent entering through sample port 104 are controllably selected through use of valve V1, a three-way valve. Thus, either raw water or influent sample are direccted into the UV reactor 110 where the water is treated with pulsed blackbody, deep-UV radiation. Discharge of the radiated water is through valve V2 into feed tank 112 which is provided with overflow line 114 to drain 116 through valve V3. Radiated water is drawn from feed tank 112 by feed pump 118 where it can be routed by valve V4 either into the filtration membrane 120 or to the drain 122. Water which passes throught the filtration membrane 120 or other filter mechanism or action can be routed to the drain 116 through filtrate exit port 124 or permeate exit port 126. Valve V6 directs permeate out 130 of the system 100 for use as drinking water, etc., or back into reflux (RF) tank 132 where reflux pump 134 routs the water back up to valve V6.

Cleaning the system is performed using caustic or other specialized cleaners. In the preferred embodiment, a caustic supply 140 is pumped by caustic pump 142 to the reflux water line from reflux pump 134 where it can be used to backwash the membrane 120.

Pressure sensing device P1 measures the pressure of the system 100 at the outlet of the feed pump 118 which is at the inlet to the fiter membrane 120. Pressure sensing device P2 determines the pressure of the permeate at the exit port or outlet 126 of the filter membrane 120. Pressure sensing device P3 senses the pressure of the system 100 at the overflow line 144 it will be understood that additional valves and/or pressure guages, sensors, regulators, relief valves, etc., can be provided as desired.

Figure 3:
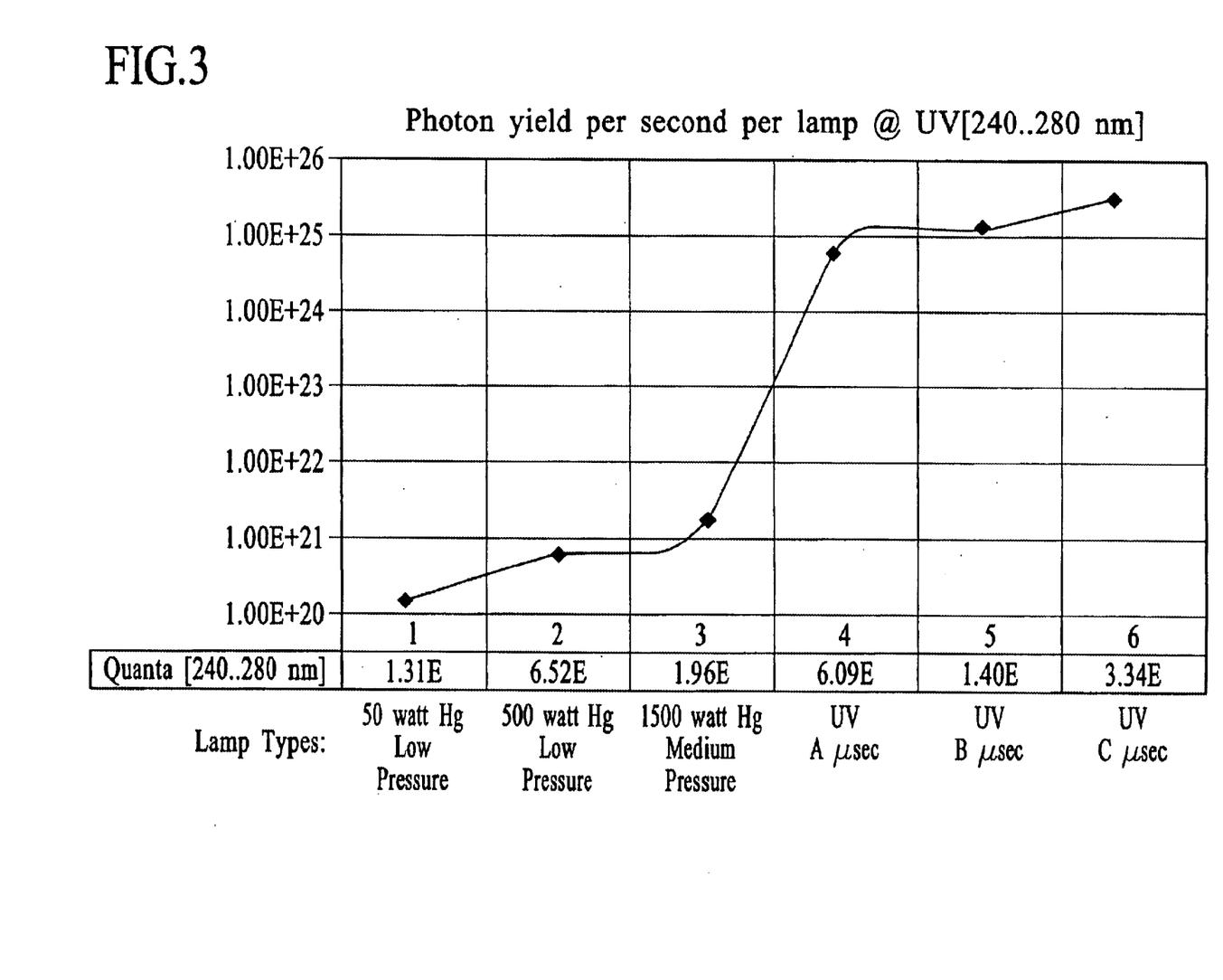
FIG. 3 is a representative schematic compariative view of the pulsed blackbody UV and conventional mercury vapor UV photon flux.

FIG. 3 is a representative schematic compariative view of the pulsed blackbody UV and conventional mercury vapor UV photon flux. The pulsed blackbody, deep-UV system of the present invention predominantly radiates in the UV region with a high emissivity blackbody peak of 260 nm, as shown in FIG. 1. The high emissivity pulsed blackbody, deep-UV radiation profile equates to high peak power and, consequently, a "high photon flux," which refers here to the number of photons emitted per pulse per lamp surface area. By comparison, with mercury UV, the term photon flux refers to the number of photons emitted per second per lamp surface area. This is shown in FIG. 3.

With pulsed blackbody, deep-UV, wavelengths from 185 nm, the smallest wavelength the quartz will transmit, through the visible range and into the infrared at 3,000 nm are present in a high emissivity continuum. Approximately about 38 to about 52 percent, depending on how the lamp is used in a particular application, of the output is in the interval of about 185 to about 400 nm. As described above, FIG. 1 shows the blackbody spectral output of pulsed blackbody, deep-UV. This graph illustrates the strong dependence on the pulse duration and temporal shape of the electrical pulse.

By changing certain lamp electrical parameters, a significant change in plasma temperature occurs which result in a shift in the blackbody peak. One type of electrical change results in the lamp being run at higher power, i.e., hotter plasma, and the blackbody peak shifts deeper into the ultraviolet. However, not all applications require that a lamp be run at such high power. The tradeoff in operating a lamp at higher power is a decline in lamplife because of the increased heat and inefficiency because any wavelengths developed by the plasma less than 185 nm are strongly absorbed by the quartz envelope of the flashlamp and the treatment water.

The radiant "excitance" or power density at the lamp surface ranges from 40,000 watts per square centimeter (W/cm2) to 170,000 W/cm2 per pulse with peak power ranging from 2 megawatts (MW) to 6 MW per pulse respectively. FIG. 3 shows the comparison between mercury lamps and pulsed blackbody, deep-UV photon flux.

The root-mean-square power (RMS), or the power that you pay the electric company for, ranges from about 300 to about 5,000 watts. In pulsed lamps, the peak power and not the RMS power is responsible for the large number of UV photons, with the RMS power serving as a function of the number of pulses per second (pps) that are applied generally in the range of about 0.1 to about 30 pulses per second (pps).

EXAMPLES

Figure 4:
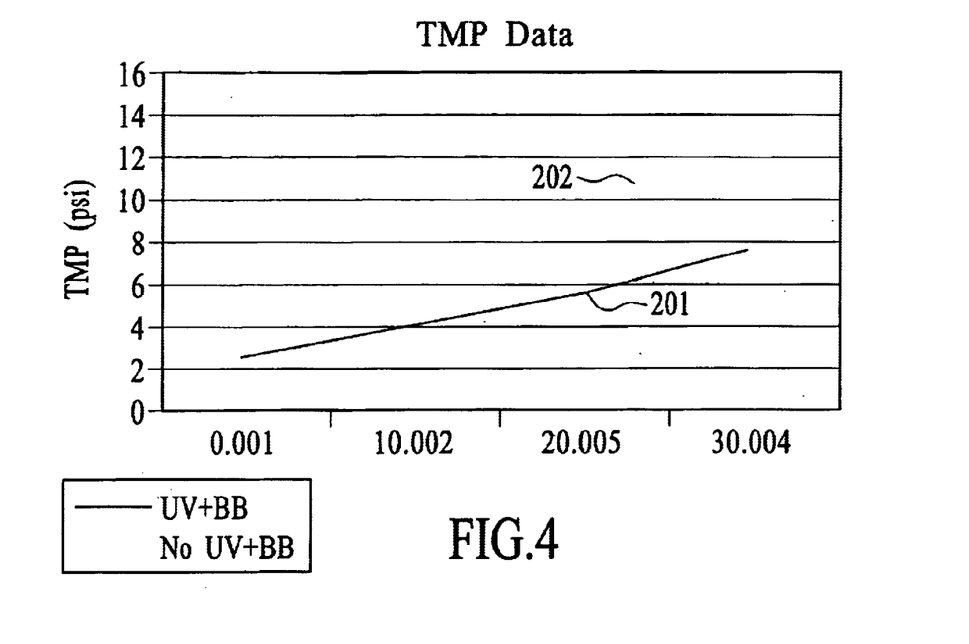
FIG. 4 is a representative illustration of a comparative analysis of a generally lower transmembrane pressure (TMP) in the case of the present invention as compared to a system of the priro art, over a time period roughly equivalent to about one (1) 30-minute filtration cycle.

FIG. 4 is a representative illustration of a comparative analysis of a generally lower transmembrane pressure (TMP) in the case of the present invention as compared to a system of the priro art, over a time period roughly equivalent to about one (1) 30-minute filtration cycle. The graph shows a typical 30 minute filtration inverval between backwash cycles. The trans-membrane pressure (TMP), using the present invention is significantly reduced even though inorganic material including Fe/Mn complexes, which previously existed in a dissolved state prior to passage through the system, has precipitated and is now being trapped by the downstream mechanical filter. The reason for the enhancement of the flux is that organic loading has been greatly reduced because of the effective oxidation properties of blackbody UV.

FIG. 4 is representative of performance of a typical filtration system over the typical thirty minute filtration interval in between backwash cycles. The study was performed using reservoir water surface. Power consumption during this test was 4–5 kWh/1,000-gallon for 50% average flux enhancement. Two filter systems with identical designs, except for one was fitted with the deep-UV blackbody radiator of the present invention upstream of the filter membrane. The curve 201 shows that the TMP for the system fitted with the present invention stayed low as compared to the TMP in the prior art system with identical design shown by the dotted curve 202. The filtration cycle was 30-minutes followed by a 6-minute backwash cycle.

Figure 5:
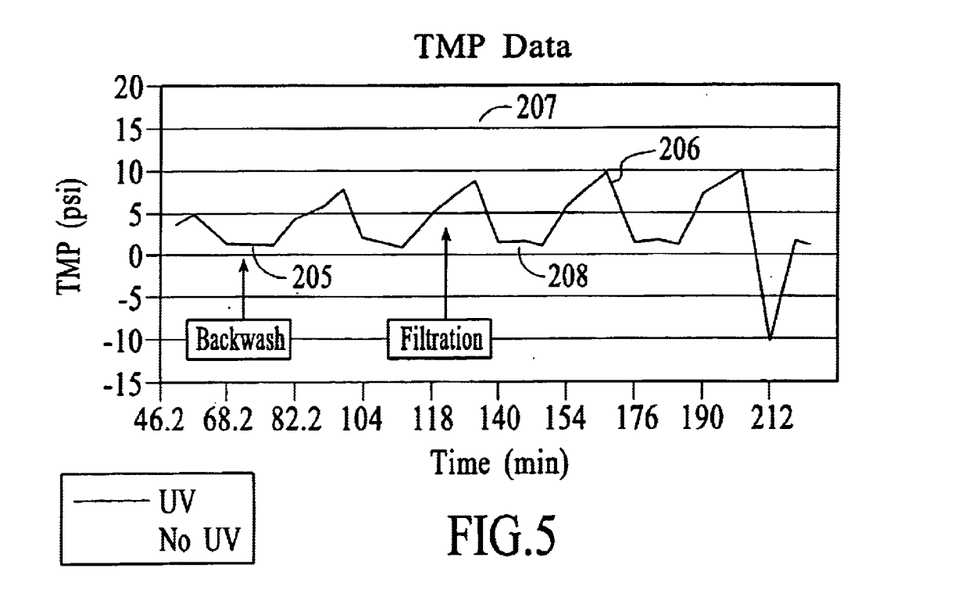
FIG. 5 is a representative illustration of a comparative analysis of a generally lower transmembrane pressure (TMP) in the case of the present invention as compared to a system of the priro art, over a time period roughly equivalent to about five (5) filtration/backwash cycles.

FIG. 5 is a representative illustration of a comparative analysis of a generally lower transmembrane pressure (TMP) in the case of the present invention as compared to a system of the priro art, over a time period roughly equivalent to about five (5) filtration/backwash cycles. The crests 206 and the troughs 205 shown in continuous line depict the low TMP using the system of the present invention. The crests 207 and the troughs 208 shown in dotted line represent the higher TMP using a system of the prior art with an otherwise identical design without the use of the pulsed blackbody, deep-UV radiator.

The test of FIGS. 4 and 5 show a flux enhancement of approximately 50%. This means significantly less organic wastes and significantly improved filtration efficacy can be achieved. The dissolved materials such as Fe and Mn precipitate by the use of the UV black body radiation and create a hydroxide crystal. The hydroxide crystals thus created are trapped with micro filtration. Thus, a fewer number of membrane units (50% less) are used by placing the present system upstream.

NEW HAMPSHIRE CASE STUDY

The Manchester Water Works Lower Station, Manchester, N.H., was the site of the first portion of a pulsed blackbody, deep-UV membrane flux enhancement and virus kill study. The source water came from Lake Manabessic via a canal system that runs for about two miles through residential and wooded country, undoubtedly picking up fertilizers and making the treatment stream more eutrophic as it becomes heavily contaminated with algae, diatoms and humic substances.

Data accumulated includes the following. Values are optimistic because of data resolution. More detailed analysis shows about 35% to 45% Flux enhancement.

Figure 6A:
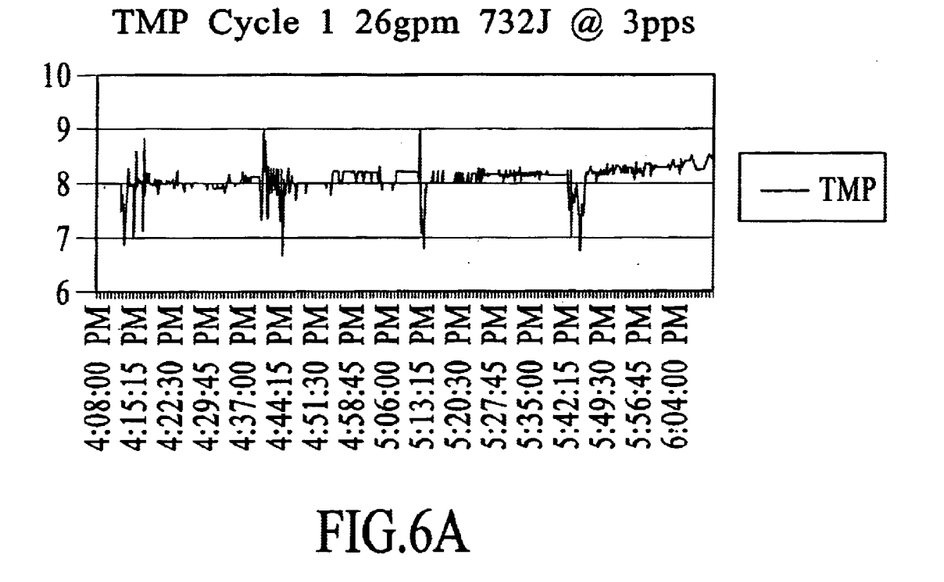
FIG. 6A shows the results of TMP test cycle 1.

| Cycle 1 | TMP | DP | Dt | DTMP |
|---|---|---|---|---|
| Start | 8.0 | 0.3 | 1:49:45 | 0.006 |
| End | 8.3 | | | |

FIG. 6A shows the results of TMP test cycle 1.

Figure 6B:
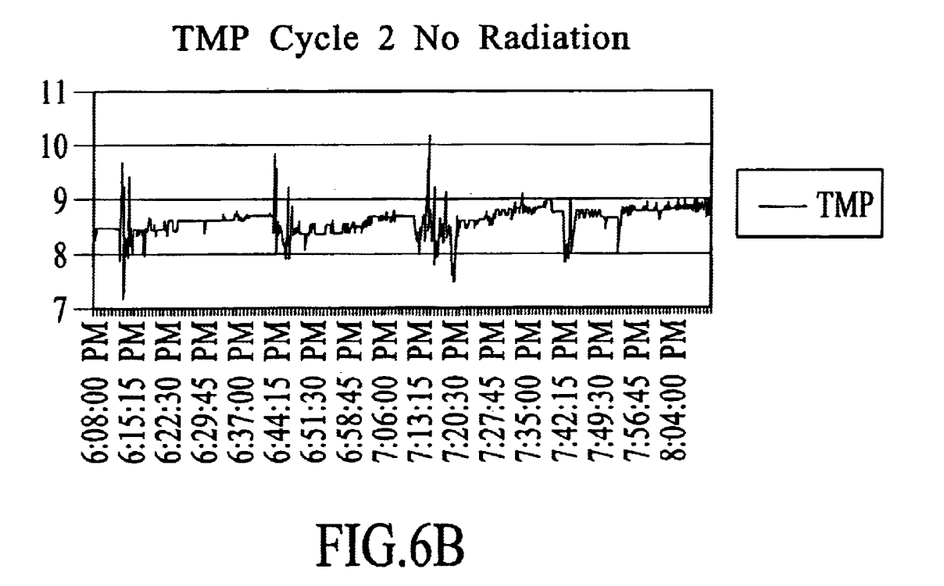
FIG. 6B shows the results of TMP test cycle 2.

| Cycle 2 | TMP | DP | Dt | DTMP |
|---|---|---|---|---|
| Start | 8.3 | 0.6 | 1:49:45 | 0.012 |
| End | 8.9 | | | |

Flux (cycle 1/cycle 2): 50.0%

FIG. 6B shows the results of TMP test cycle 2.

Figure 6C:
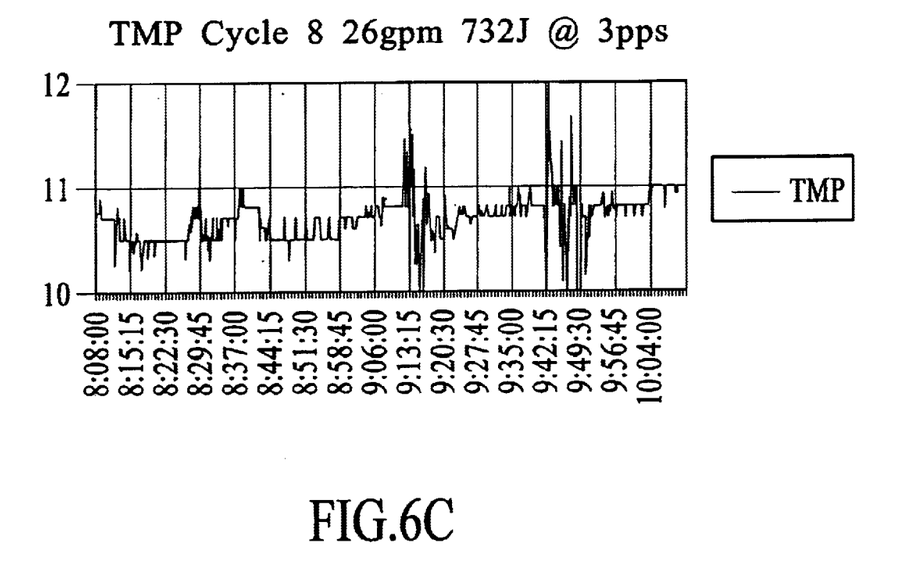
FIG. 6C shows the results of TMP test cycle 8.

| Cycle 8 | TMP | DP | Dt | DTMP |
|---|---|---|---|---|
| Start | 10.7 | 0.3 | 1:49:45 | 0.006 |
| End | 11.0 | | | |

FIG. 6C shows the results of TMP test cycle 8.

Figure 6D:
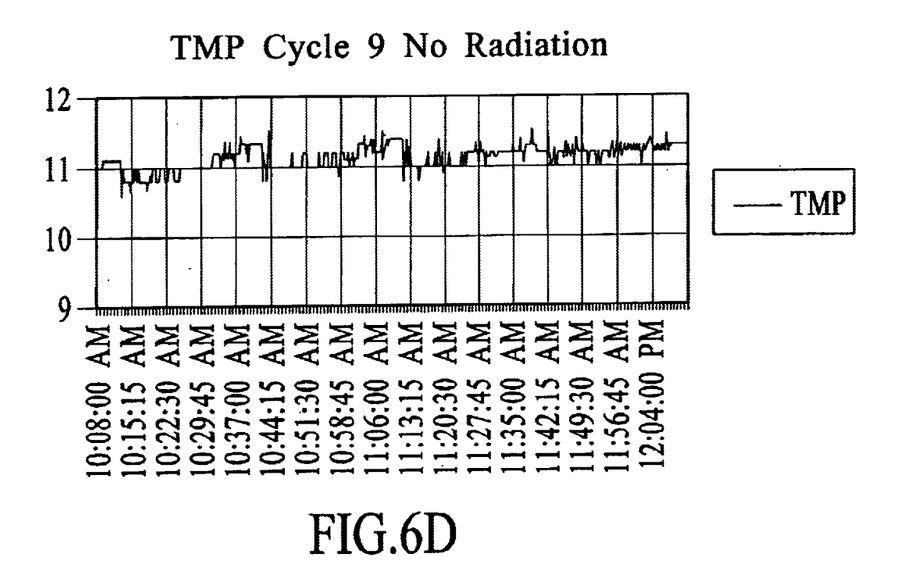
FIG. 6D shows the results of TMP test cycle 9.

| Cycle 9 | TMP | DP | Dt | DTMP |
|---|---|---|---|---|
| Start | 10.8 | 0.5 | 1:49:45 | 0.010 |
| End | 11.3 | | | |

Flux (cycle 8/cycle 9): 40.0%

FIG. 6D shows the results of TMP test cycle 9.

Figure 6E:
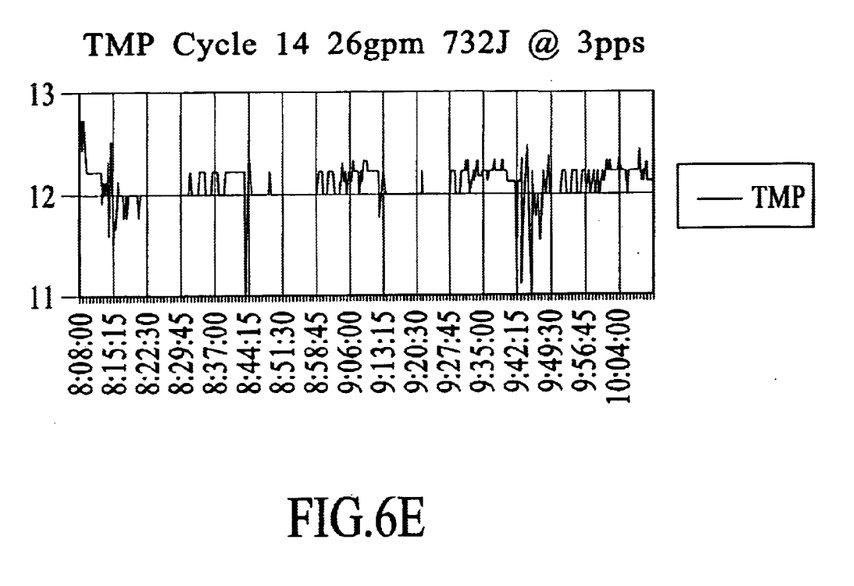
FIG. 6E shows the results of TMP test cycle 14.

| Cycle 14 | TMP | DP | Dt | DTMP |
|---|---|---|---|---|
| Start | 12.0 | 0.2 | 1:49:45 | 0.004 |
| End | 12.2 | | | |

FIG. 6E shows the results of TMP test cycle 14.

Figure 6F:
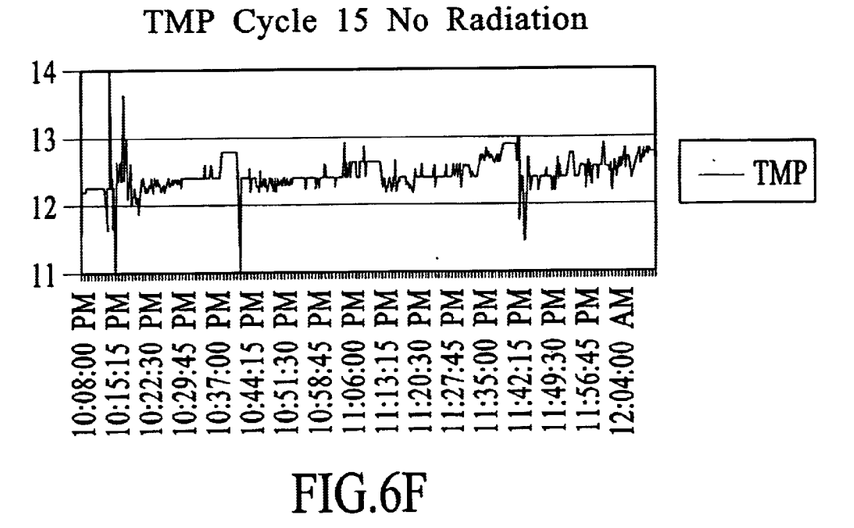
FIG. 6F shows the results of TMP test cycle 15.

| Cycle 15 | TMP | DP | Dt | DTMP |
|---|---|---|---|---|
| Start | 12.2 | 0.6 | 1:49:45 | 0.012 |
| End | 12.8 | | | |

Flux (cycle 14/cycle 15): 66.7%

FIG. 6F shows the results of TMP test cycle 15.

Figure 6G:
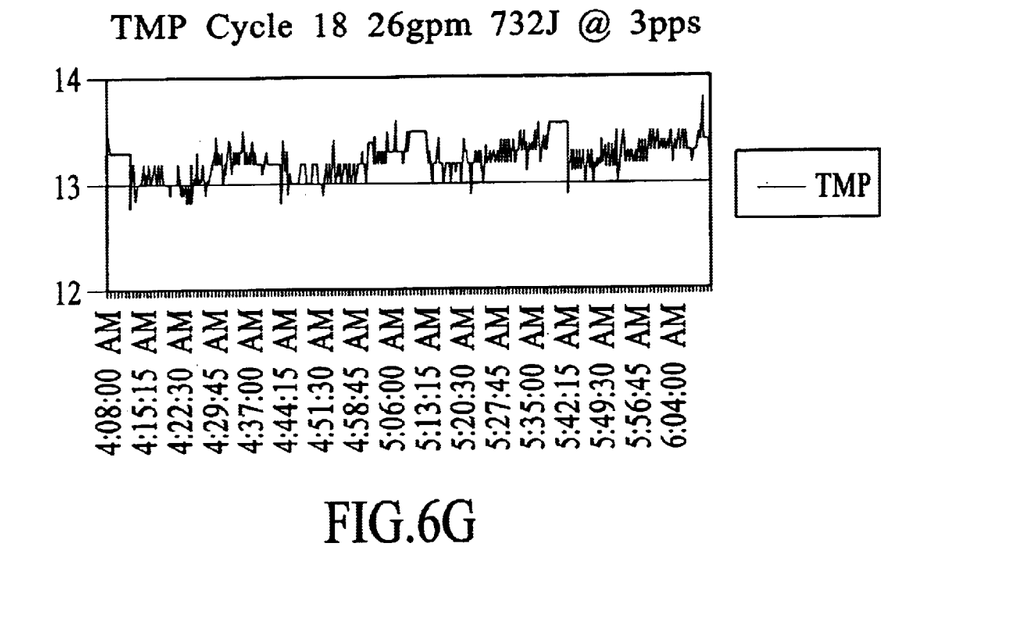
FIG. 6G shows the results of TMP test cycle 18.

| Cycle 18 | TMP | DP | Dt | DTMP |
|---|---|---|---|---|
| Start | 13.3 | 0.2 | 1:49:45 | 0.004 |
| End | 13.5 | | | |

FIG. 6G shows the results of TMP test cycle 18.

Figure 6H:
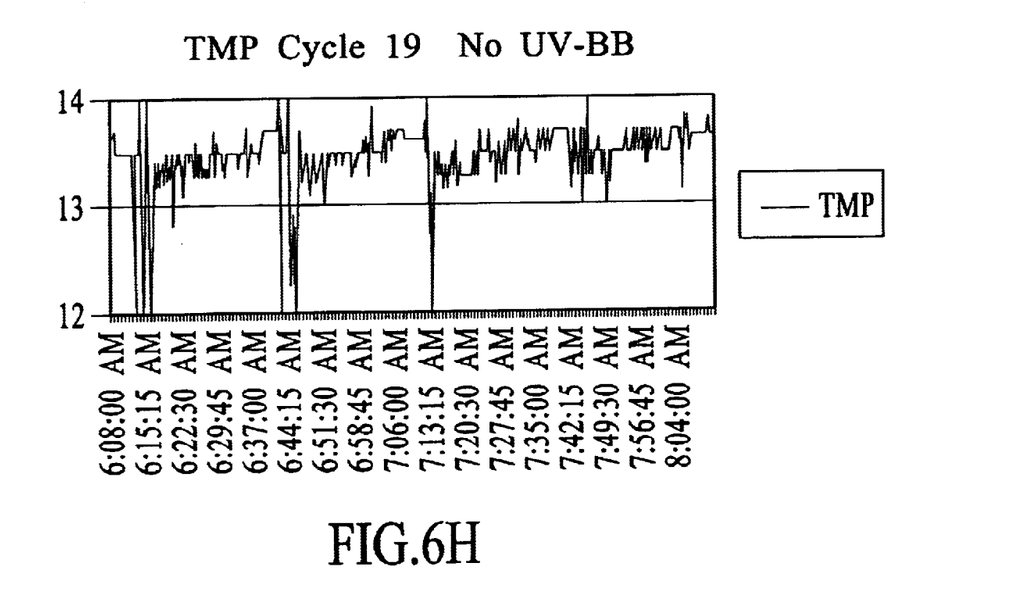
FIG. 6H shows the results of TMP test cycle 19.

| Cycle 19 | TMP | DP | Dt | DTMP |
|---|---|---|---|---|
| Start | 13.3 | 0.4 | 1:49:45 | 0.008 |
| End | 13.7 | | | |

Flux (cycle 18/cycle 19): 50.0%

FIG. 6H shows the results of TMP test cycle 19.

In yet another study, change in TMP was measured as a function of flowrate. The measurements were taken both with and without the use of pulsed blackbody, deep-UV radiation of the filtration membrane. The following data describes the results:

| Flow (GPM) | ΔTMP w/o UV (psi) | ΔTMP w/UV (psi) |
|---|---|---|
| 2 | 0.076 | 0.027 |
| 3 | 0.113 | 0.052 |
| 4 | 0.423 | 0.216 |

Figure 7:
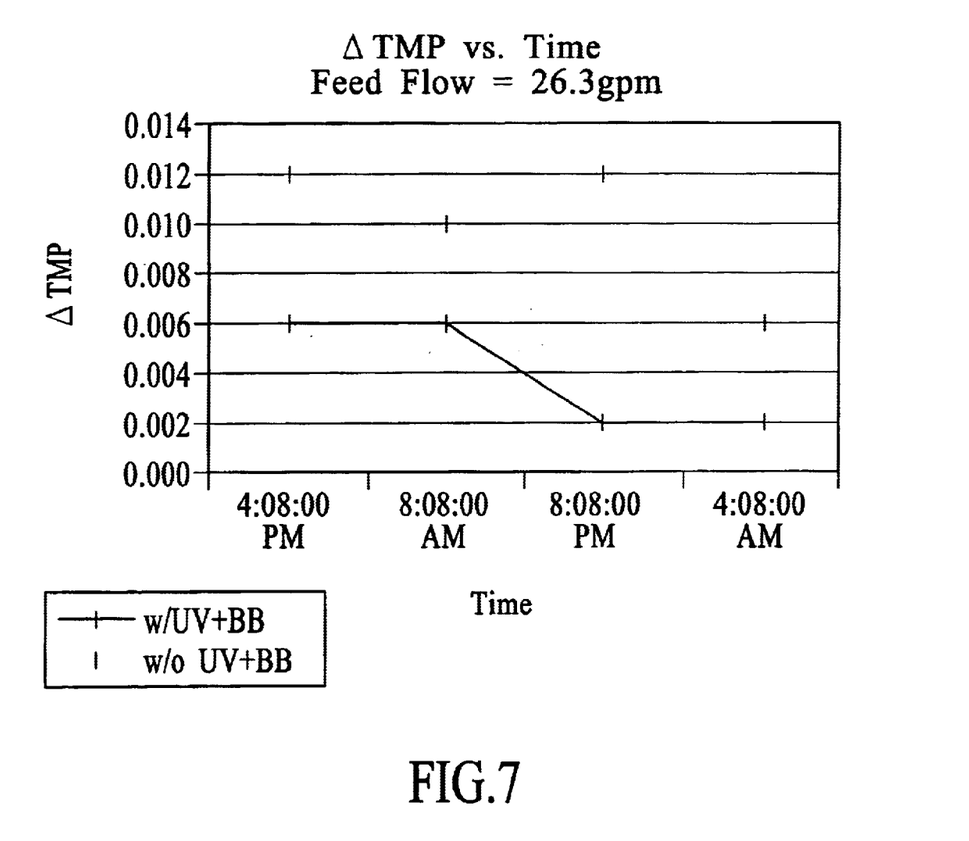
FIG. 7 is a representative drawing showing the change (delta) of TMP plotted versus time.

FIG. 7 is a representative drawing showing the change (over time) of TMP versus time. The pulsed blackbody, deep-UV unit was placed upstream of the 6-inch hollow-fiber membrane unit. The flow rate chosen for the test was 26 gpm average, which challenged the membrane at a flux values of 62 gallons per square foot per day (gfd) which is approximately twice the design flux. FIG. 6 illustrates the flow dynamics at the challenge flowrate.

It is apparent is that the about 50 percent increase in flux at the higher flow rate is due to the action of pulsed blackbody, deep-UV on the raw influent treatment stream. The maximum RMS power required for this treatment is 1700 watts, which would allow, in practice, a reduction in the number of membrane units while still maintaining the flux. This has the potential to reduce both capital and operating-and-maintenance costs of hollow-fiber membrane systems for potable water treatment.

Additionally, the microbial kill associated with pulsed blackbody, deep-UV is high. In this study, MS2 coliphage was the chosen virus and the raw treatment stream was inoculated with 106 plaque-forming units (PFU) from a 2-liter titer or standard concentration of solution by titration of 108 PFU. Duplicate samples were collected at 10-minute intervals for 30 minutes on the influent and effluent of the pulsed blackbody, deep-UV reactor.

To avoid potential discharge problems with potential surviving viruses, a smaller, model flowrate was employed A reactor influence test was first conducted at the challenge flow rate of 3-gpm to see if the reactor alone (without the pulsed blackbody, deep-UV unit active) has any influence on the virus kill. As suspected, flow through the reactor without radiation resulted in no loss of viral activity. Following this, the pulsed blackbody, deep-UV radiator was activated at 1 pps (590 watts RMS) with peak power at 2.5-MW total spectrum (~1.2 MW UV from 185-to-400 nm) and the virus sampling commenced. A 6-log removal was demonstrated and is summarized in Table 1. The 0.00 effluent values are actual counts and not detection limits (bioassay performed by University of New Hampshire).

TABLE 1

| Time | Influent $10^6$ | | Effluent $10^6$ | |
|---|---|---|---|---|
| Intervals (min) | Sample 1 | Sample 2 | Sample 1 | Sample 2 |
| 10 | 1.08 | 0.97 | 0.00 | 0.00 |
| 20 | 1.02 | 1.34 | 0.00 | 0.00 |
| 30 | 1.03 | 0.84 | 0.00 | 0.00 |

Additional pulsed blackbody, deep-UV radiators and water purifications systems are described in U.S. Pat. Nos. 6,117,335 and 6,200,466. The present invention incorporates by reference in their entireties U.S. Pat. Nos. 6,117,335 and 6,200,466.

Unless defined otherwise, all technical and scientific terms used herein have the same meaning as commonly understood by one of ordinary skill in the art to which this invention belongs. Although any methods and materials similar or equivalent to those described can be used in the practice or testing of the present invention, the preferred methods and materials are now described. All publications and patent documents referenced in this application are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A system with enhanced water flux through a filter membrane, the system comprising an electromagnetic radiator which produces high-power, pulsed blackbody, deep-ultraviolet radiation, the electromagnetic radiator having at least one fluid inlet and at least one fluid outlet and having at least one treatment chamber;

a filtration membrane, the filter membrane disposed adjacent the at least one fluid outlet of the electromagnetic radiator to filter the water irradiated with the pulsed blackbody, deep-UV irradiation, wherein the precipitation of inorganic molecules and organically complexed minerals, partial or complete mineralization of organic molecules and the deactivation or destruction of microbes caused by the oxidizing species reduce the transmembrane pressure.

2. The system of claim 1 wherein the filtration membrane constitutes a microfiltration membrane.

3. The system of claim 1 wherein the filtration membrane constitutes a plurality of membranes.

4. The system of claim 1 in which the electromagnetic radiator can be pulsed at a rate of between about 0.1 to about 30.0 pulses per second.

5. The system of claim 1 further comprising pump and associated valves for backwashing the filtration membrane.

6. The system of claim 1 further comprising a pre-filter disposed between the electromagnetic radiator and the inlet to the filter membrane.

7. The system of claim 1 in which the electromagnetic radiator comprises a lamp which develops a radiant excitance of between about 40,000 $W/cm^2$ to about 170,000 $W/cm^2$.

8. The system of claim 1 in which the electromagnetic radiator comprises a lamp which develops a peak power output of between about 2 MW to about 6 MW.

9. The system of claim 1 in which the electromagnetic radiator comprises a lamp which radiates electromagnetic energy at wavelengths between about 185 nm to about 3,000 nm.

10. The system of claim 9 in which about 38 percent to about 52 percent of the output electromagnetic energy has wavelengths in the range of between about 185 nm to about 400 nm.

11. A method for enhancement of flux through a hollow fiber-type filter membrane, the method comprising the following steps:

treating the water to be filtered by exposure to pulsed blackbody, deep-UV electromagnetic radiation prior to purifying the water with a hollow fiber-type main filter membrane to prevent fouling of the membrane by the group of contaminants of water consisting of organic molecules, metal ions and complexed minerals.

12. The method of claim 11 wherein oxidation of a water matrix by the pulsed blackbody UV yields ozone, hydrogen peroxide, and hydroxyl radicals.

13. The method of claim 12 further comprising the step of backwashing the main filtration membrane.

14. The method of claim 13 in which the step of treating the water with radiation lasts for 30 minutes.

15. The method of claim 12 further comprising the step of pre-filtering the water prior to filtration of the water through the main filter membrane.

16. The method of claim 12 in which the electromagnetic radiation develops a radiant excitance of between about 40,000 $W/cm^2$ to about 170,000 $W/cm^2$.

17. The method of claim 12 in which the electromagnetic radiation develops a peak power output of between about 2 MW to about 6 MW.

18. The method of claim 12 in which the electromagnetic radiation has wavelengths between about 185 nm to about 3,000 nm.

19. The method of claim 13 in which about 38 percent to about 52 percent of the electromagnetic radiation has wavelengths in the range of between about 185 nm to about 400 nm.

20. The method of claim 12 in which the electromagnetic radiation is pulsed at a rate of between about 0.1 to about 30.0 pulses per second.

* * * * *

UNITED STATES PATENT AND TRADEMARK OFFICE
CERTIFICATE OF CORRECTION

PATENT NO.   : 6,761,826 B2
DATED        : July 13, 2004
INVENTOR(S)  : Bender

It is certified that error appears in the above-identified patent and that said Letters Patent is hereby corrected as shown below:

<u>Column 14,</u>
Lines 10-30, please change the correction of dependency in claims 13 through 20

13. The method of Claim 11 further comprising the step of backwashing the main filtration membrane.

14. The method of Claim 12 in which the step of treating the water with radiation lasts for 30 minutes.

15. The method of Claim 11 further comprising the step of pre-filtering the water prior to filteration of the water through the main filter membrane.

16. The method of Claim 11 in which the electromagnetic radiation develops a radiant excitance of between about 40,000 W/cm$^2$ to about 170,000 W/cm$^2$.

17. The method of Claim 11 in which the electromagnetic radiation develops a peak power output of between about 2 MW to about 6 MW.

18. The method of Claim 11 in which the electromagnetic radiation has wavelengths between about 185 nm to about 3,000 nm.

19. The method of Claim 12 in which about 38 percent to about 52 percent of the electromagnetic radiation has wavelengths in the range of between about 185 nm to about 400 nm.

20. The method of Claim 11 in which the electromagnetic radiation is pulsed at a rate of between about 0.1 to about 30.0 pulses per second .

Signed and Sealed this

Third Day of May, 2005

JON W. DUDAS
*Director of the United States Patent and Trademark Office*